United States Patent
Soken et al.

(10) Patent No.: US 9,067,134 B2
(45) Date of Patent: Jun. 30, 2015

(54) VIDEO GAME PROCESSING APPARATUS AND VIDEO GAME PROCESSING PROGRAM PRODUCT

(71) Applicant: KABUSHIKI KAISHA SQUARE ENIX, Tokyo (JP)

(72) Inventors: Masayoshi Soken, Tokyo (JP); Yoshinori Tsuchida, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 131 days.

(21) Appl. No.: 13/967,553

(22) Filed: Aug. 15, 2013

(65) Prior Publication Data
US 2014/0051516 A1  Feb. 20, 2014

(30) Foreign Application Priority Data

Aug. 17, 2012  (JP) ................ P2012-180890

(51) Int. Cl.
| | |
|---|---|
| A63F 9/24 | (2006.01) |
| H04S 1/00 | (2006.01) |
| A63F 13/00 | (2014.01) |
| A63F 13/40 | (2014.01) |
| A63F 13/54 | (2014.01) |
| G10H 1/00 | (2006.01) |

(52) U.S. Cl.
CPC ............. *A63F 13/00* (2013.01); *A63F 13/10* (2013.01); *A63F 13/54* (2014.09); *G10H 1/0025* (2013.01); *G10H 2210/151* (2013.01); *G10H 2220/135* (2013.01)

(58) Field of Classification Search
None
See application file for complete search history.

(56) References Cited

U.S. PATENT DOCUMENTS

| | | | |
|---|---|---|---|
| 7,947,890 B2 | 5/2011 | Orikata | |
| 8,408,997 B2 | 4/2013 | Miyagawa et al. | |
| 8,466,363 B2 | 6/2013 | Tsuchida | |
| 2005/0114526 A1 | 5/2005 | Aoyama | |
| 2008/0009347 A1* | 1/2008 | Radek | 463/35 |
| 2010/0040349 A1* | 2/2010 | Landy | 386/96 |
| 2011/0306397 A1* | 12/2011 | Fleming et al. | 463/7 |
| 2012/0077590 A1* | 3/2012 | Yamamoto et al. | 463/31 |
| 2013/0282388 A1* | 10/2013 | Engdegard | 704/500 |

FOREIGN PATENT DOCUMENTS

JP  2002-119763  4/2012

* cited by examiner

*Primary Examiner* — Dmitry Suhol
*Assistant Examiner* — Jason Yen
(74) *Attorney, Agent, or Firm* — Greenblum & Bernstein, P.L.C.

(57) ABSTRACT

Sounded reproduction of basic sound data indicating a game sound to be reproduced in a video game and sound deadening reproduction of coda data indicating coda used as a termination sound are started when it becomes predetermined reproduction start timing in the video game to reproduce the basic sound data and the coda data in synchronization with each other. By referring to marker data indicating a plurality of markers when it becomes predetermined reproduction end timing in the video game, switching timing to switch reproduction modes and stop timing to stop reproducing are determined. When it becomes the switching timing, the sounded reproduction of the basic sound data and the sound deadening reproduction of the coda data are respectively switched into sound deadening reproduction and sounded reproduction. The reproduction of the basic sound data and the coda data is stopped when it becomes the stop timing.

5 Claims, 5 Drawing Sheets

100: VIDEO GAME PROCESSING APPARATUS

MARKER DATA

| MARKER | TIME(S) | ... |
|---|---|---|
| M1 | 10.5 | ... |
| M2 | 11.0 | ... |
| M3 | 11.5 | ... |
| ⋮ | ⋮ | ⋮ |

(A) START OF REPRODUCTION (B) AFTER STOP COMMAND,
SWITCHING WHEN TO REACH NEXT MARKER (C) COMPLETELY STOP
WHEN TO REACH FURTHER NEXT MARKER

VIDEO GAME PROCESSING APPARATUS AND VIDEO GAME PROCESSING PROGRAM PRODUCT

CROSS-REFERENCE TO RELATED APPLICATION

The present application relates to subject matter contained in Japanese Patent Application No. 2012-180890, filed on Aug. 17, 2012, the disclosure of which is expressly incorporated herein by reference in its entirety.

BACKGROUND OF THE INVENTION

1. Field of the Invention

The present invention relates to a technique for controlling progress of a video game.

2. Description of the Related Art

Heretofore, in a video game, music is reproduced in accordance with an event carried out in the video game. Various kinds of controls of reproducing music in various modes, such as reproducing different music in accordance with development of an event, have been proposed (for example, see Japanese Patent Application Publication No. 2002-119763).

However, when reproduction of music is to be terminated in a conventional video game, the reproduction of the music is generally terminated by simply stopping the reproduction or feeding out the reproduction. For this reason, there has been a problem that reproduction of music cannot be terminated smoothly in accordance with an event or the like in the video game.

SUMMARY OF THE INVENTION

The present invention has been made in order to solve the problem described above, and it is an object of the present invention to be capable of smoothly terminating reproduction of music in a video game.

In order to achieve the above object, the present invention is directed to a video game processing apparatus for controlling progress of a video game. The video game processing apparatus according to the present invention includes a basic sound data memory for storing basic sound data, the basic sound data indicating a game sound to be reproduced in the video game.

The video game processing apparatus also includes a coda data memory for storing coda data, the coda data indicating coda used as a termination sound when reproduction of the game sound is terminated.

The video game processing apparatus also includes a marker data memory for storing marker data, the marker data indicating a plurality of markers, each of the plurality of markers being timing when a reproduction mode can be switched.

The video game processing apparatus also includes a reproducer that starts sounded reproduction of the basic sound data and sound deadening reproduction of the coda data when it becomes predetermined reproduction start timing in the video game, the reproducer reproducing the basic sound data and the coda data in synchronization with each other.

The video game processing apparatus also includes a timing determiner that refers to the marker data when it becomes predetermined reproduction end timing in the video game, the timing determiner determining switching timing to switch the reproduction modes and stop timing to stop reproducing.

In this case, the reproducer includes: a switcher for switching, when it becomes the switching timing, the sounded reproduction of the basic sound data into sound deadening reproduction, the switcher switching the sound deadening reproduction of the coda data into sounded reproduction; and a stopper for stopping the reproduction of the basic sound data and the coda data when it becomes the stop timing.

By configuring the video game processing apparatus as described above, it becomes possible to smoothly terminate reproduction of music in a video game.

In the video game processing apparatus according to the present invention, it is preferable that the video game processing apparatus further includes: a music file memory for storing a music file, a basic sound track and a coda track being stored in the music file, the basic sound track functioning as the basic sound data memory for storing the basic sound data, the coda track functioning as the coda data memory for storing the coda data so as to be capable of being reproduced in synchronization with the basic sound data.

In the video game processing apparatus according to the present invention, it is preferable that the marker data memory is stored in the music file.

In the video game processing apparatus according to the present invention, it is preferable that the coda data are configured so that the same data are set up sequentially between two adjacent markers.

Moreover, in another aspect of the present invention, the present invention is directed to a non-transitory computer-readable medium including a video game processing program product for causing a computer to control progress of a video game. In this case, the computer includes: a basic sound data memory for storing basic sound data, the basic sound data indicating a game sound to be reproduced in the video game; a coda data memory for storing coda data, the coda data indicating coda used as termination sound when reproduction of the game sound is terminated; and a marker data memory for storing marker data, the marker data indicating a plurality of markers, each of the plurality of markers being timing when a reproduction mode can be switched.

The video game processing program product causes the computer to execute steps including starting sounded reproduction of the basic sound data and sound deadening reproduction of the coda data when it becomes predetermined reproduction start timing in the video game, and reproducing the basic sound data and the coda data in synchronization with each other.

The steps also include referring to the marker data when it becomes predetermined reproduction end timing in the video game, and determining switching timing to switch reproduction modes and stop timing to stop reproducing.

In this case, the step of reproducing the basic sound data and the coda data in synchronization with each other includes: switching, when it becomes the switching timing, the sounded reproduction of the basic sound data into sound deadening reproduction, and switching the sound deadening reproduction of the coda data into sounded reproduction; and stopping the reproduction of the basic sound data and the coda data when it becomes the stop timing.

According to the present invention, it is possible to smoothly terminate reproduction of music in a video game.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment of the present invention will be described with reference to the appending drawings.

Figure 1:
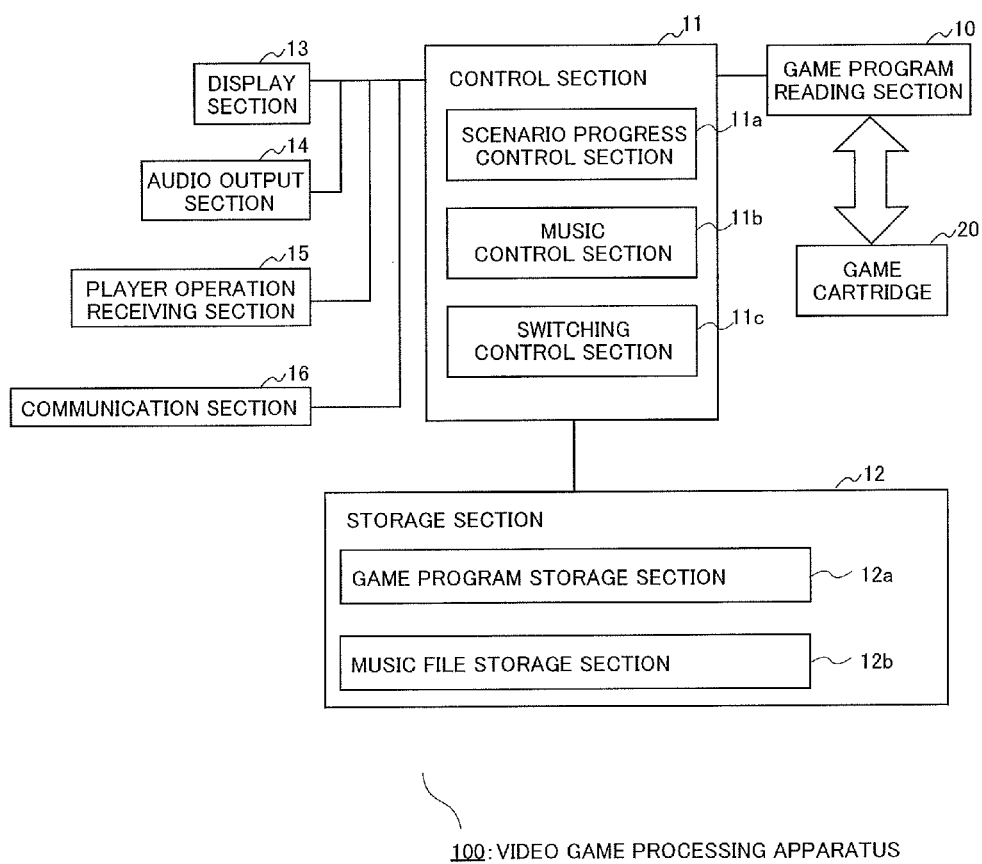
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio output section 14; a player operation receiving section 15; and a communication section 16.

The game program reading section 10 has a function to read out a necessary video game program from a storage medium in which a storage medium is embedded. Various kinds of video game programs are stored in the storage medium. In this regard, in the present embodiment, the game program reading section 10 has a mounting section into which a game cartridge 20, in which the video game program is stored, is detachably mounted. A player (that is, an operator (or a user) of the video game processing apparatus 100) reads out a video game program from a storage medium of the game cartridge 20 that is mounted into the mounting section, and stores the read-out video game program in the storage section 12. In this regard, the video game carried out in accordance with the video game program used in the present embodiment may be any one such as an RPG and a simulation game so long as the video game is a video game in which a different piece of music is reproduced in accordance with progress of the video game.

The control section 11 has a function to carry out the video game program read out by the game program reading section 10 and stored in the storage section 12, and a function to carry out various kinds of controls for causing a video game to proceed in response to operations by the player. In the present embodiment, the control section 11 includes: a scenario progress control section 11a; a music control section 11b; and a switching control section 11c.

The scenario progress control section 11a has a function to carry out various kinds of controls for controlling progress of a scenario of the video game in accordance with the video game program.

The music control section 11b has a function to carry out various kinds of controls for reproducing a music file. In the present embodiment, the scenario progress control section 11a instructs the music control section 11b to reproduce music used in a game scene to be carried out in accordance with progress of the video game on the basis of designation (command) of the video game program, by which reproduction of the music in the video game is carried out. When a reproduction command for the music is inputted from the scenario progress control section 11a, the music control section 11b refers to a music file storage section 12b (will be described later); reads out a music file, which indicates music that is defined in advance as one to be used in the game scene, from the music file storage section 12b; and controls the music file.

The switching control section 11c has a function to control switching of reproduction modes of a music file. A method of switching reproduction modes of a music file will be explained in detail in description of music reproducing processing (will be described later, see FIG. 6).

The storage section 12 is a storage medium for storing video game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In this regard, the video game processing apparatus 100 may be configured so that the video game program is downloaded from a video game program providing server (not shown in the drawings) via a communication network such as the Internet or the like and is stored in the storage section 12.

In the present embodiment, the storage section 12 includes a game program storage section 12a and a music file storage section 12b.

The game program storage section 12a is a storage medium for storing various kinds of programs that constitute the video game program. The game program storage section 12a may be configured so that a new program is stored therein in accordance with progress of the video game. Alternatively, the game program storage section 12a may be configured so that all of the programs used until the video game is cleared are stored therein in advance.

The music file storage section 12b is a storage medium for storing a music file. Here, the music file is a file configured by various kinds of data that are required to appropriately reproduce predetermined music in accordance with progress of the video game.

Figures 2, 3:
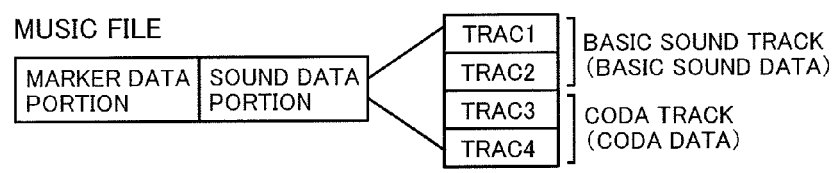
FIG. 2 is an explanatory drawing showing an example of a music file.
FIG. 3 is an explanatory drawing for explaining marker data.

FIG. 2 is an explanatory drawing showing an example of the music file stored in the music file storage section 12b. As shown in FIG. 2, the music file is configured by a marker data portion and a sound data portion.

Here, the marker data portion is a storage area in which marker data indicating a plurality of markers are stored. Each of the plurality of markers is timing (switchable timing) when a reproduction mode can be switched.

FIG. 3 is an explanatory drawing for explaining the marker data. As shown in FIG. 3, in the marker data, an identifier of a marker and a time (in the present embodiment, an elapsed time from the start of reproduction) indicating timing when a reproduction mode of sound data can be switched are associated with each other. Further, in the present embodiment, the marker data indicate timing (stoppable timing) when reproduction of the sound data can be stopped. In this regard, the switchable timing and the stoppable timing are set up in advance by a creator of the music file, for example. Further, both timings may be the same as each other, or may be different from each other. Further, the video game processing apparatus 100 may be configured so that the switching timing and the stoppable timing are combined in advance. Hereinafter, the case where a marker always indicates both switchable timing and stoppable timing will be described as an example.

In this regard, in a case where the video game processing apparatus 100 has a function (marker function) of being capable of specifying, as a marker, an arbitrary position of the music in which a music file is stored in a file (for example, the case of a Wav file or the like) in addition to the case where the creator of the music file sets up markers in his/her own right, it is thought that the markers are set up using the marker function.

Further, the sound data portion is a storage area that includes a basic sound track for storing basic sound data and a coda track for storing coda data so that the coda data can be reproduced in synchronization with the basic sound data. Hereinafter, the case where the sound data portion includes four tracks 1 to 4 will be described as an example.

Here, the coda data are data that indicate coda used as a termination sound when the reproduction of a game sound is terminated. In the present embodiment, the coda data are data that indicate a sound reproduced in a sound deadening manner (sound deadening reproduction) at the start of reproduction of the music (that is, reproduction time proceeds, but no sound is outputted) and reproduced in a sounded manner (sounded reproduction) (that is, the sound is outputted) from a predetermined period of time before the music is to be stopped as a termination portion (that is, coda).

Further, the basic sound data are data that indicate a game sound to be reproduced in the video game. In the present embodiment, the basic sound data are data that indicate a sound reproduced in a reproduction mode opposite to that of the coda data. Namely, the basic sound data are data that indicate a sound reproduced in a sounded manner from the start of the reproduction of the music to the time before the predetermined period of time at which the reproduction is to be stopped, and reproduced in a silent manner at the termination portion.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11. In the present embodiment, the audio output section 14 outputs music indicated by a music file or music data. Further, in the present embodiment, the audio output section 14 includes two speakers 14R, 14L.

The player operation receiving section 15 receives operational signals in response to operations by the player, and notifies the control section 11 of that result.

The communication section 16 causes the video game processing apparatus 100 to connect to a communication network such as the Internet by wireless or wired connections, and to transmit and receive various kinds of information.

Next, a concept of reproduction of music carried out by the video game processing apparatus 100 according to the present embodiment will be described.

Figure 4:
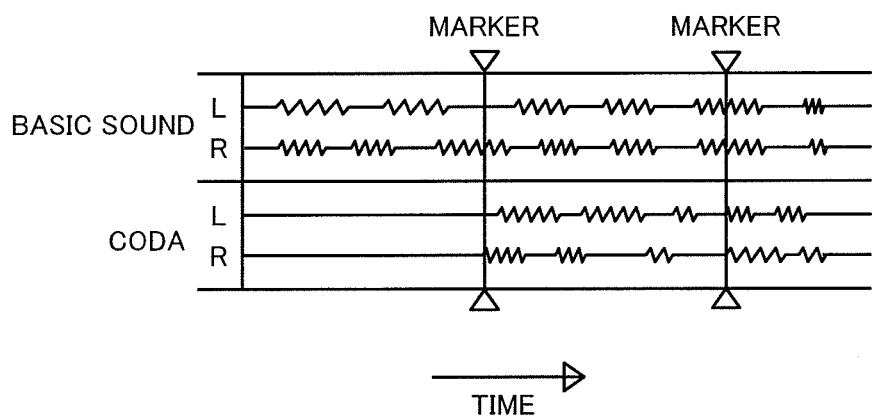
FIG. 4 is an explanatory drawing showing a configuration of a music file.

Each of FIGS. 4 and 5A to 5C is an explanatory drawing showing a configuration of a music file. As shown in FIG. 4, in original data of the music file according to the present embodiment, common markers are set up in a case where basic sound data and coda data both contained in the music file are arranged. In this regard, FIG. 4 and FIGS. 5A to 5C show that a waveform appears at sounded reproduction and a waveform does not appear at sound deadening reproduction.

Figure 5:
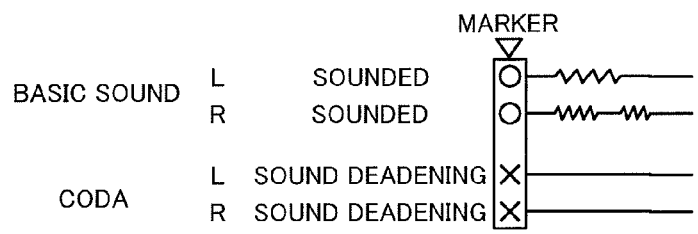
FIG. 5 is an explanatory drawing showing another configuration of music file.
Figure 5:
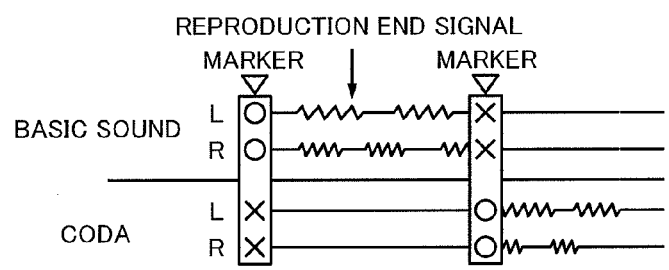
Figure 5:
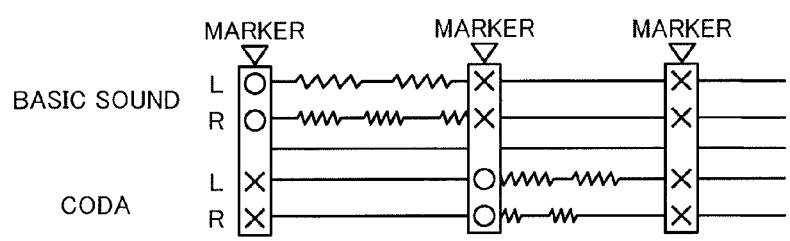

FIGS. 5A to 5C show a flow from the start of reproduction of a music file to stop of the reproduction. When an event in the video game is started and reproduction of a music file is started, for example, basic sound data stored in two tracks are reproduced with a sounded manner and coda data stored in the other two tracks are reproduced with a sound deadening manner as shown in FIG. 5A. In this regard, the video game processing apparatus 100 may be configured so that a marker indicates sounded (o) or sound deadening (x) as shown in FIG. 5. Further, in the present embodiment, the sound data portion includes four tracks 1 to 4, in which two tracks are used for the basic sound data and the other two tracks are used for the coda data. However, each of the number of all tracks, the number of tracks used for the basic sound data and the number of tracks used for the coda data is one example, and may be other number.

When an end condition of the event in the video game is met, for example, after reproduction of the music file is started, by which a stop command is issued to the reproduction of the music file, the basic sound data are switched from the sounded reproduction to the sound deadening reproduction and the coda data are switched from the sound deadening reproduction to the sounded reproduction when a reproduction point (reproduction position, that is, a reproduction position of the music that can be specified by an elapsed time from the start of the reproduction) reaches the next marker after the stop command (more specifically, after reception of reproduction end notification), as shown in FIG. 5B. Since a processing load of this switching is lower than that in the case of stopping reproduction of the basic sound data and then starting reproduction of the coda data, the switching is carried out quickly.

When it reaches a next marker (more specifically, a marker that indicates stop timing) after the reproduction mode is switched, the reproduction of the music file is stopped as shown in FIG. 5C. In this case, both of the basic sound data and the coda data are not reproduced in a sound deadening manner, but the reproduction of both data is stopped (that is, completely stopped). Namely, in order to terminate the reproduction of the music file, two processes including switching of the reproduction mode of the coda data and completely stopping are to be carried out.

Next, an operation of the video game processing apparatus 100 according to the present embodiment will be described.

Figure 6:
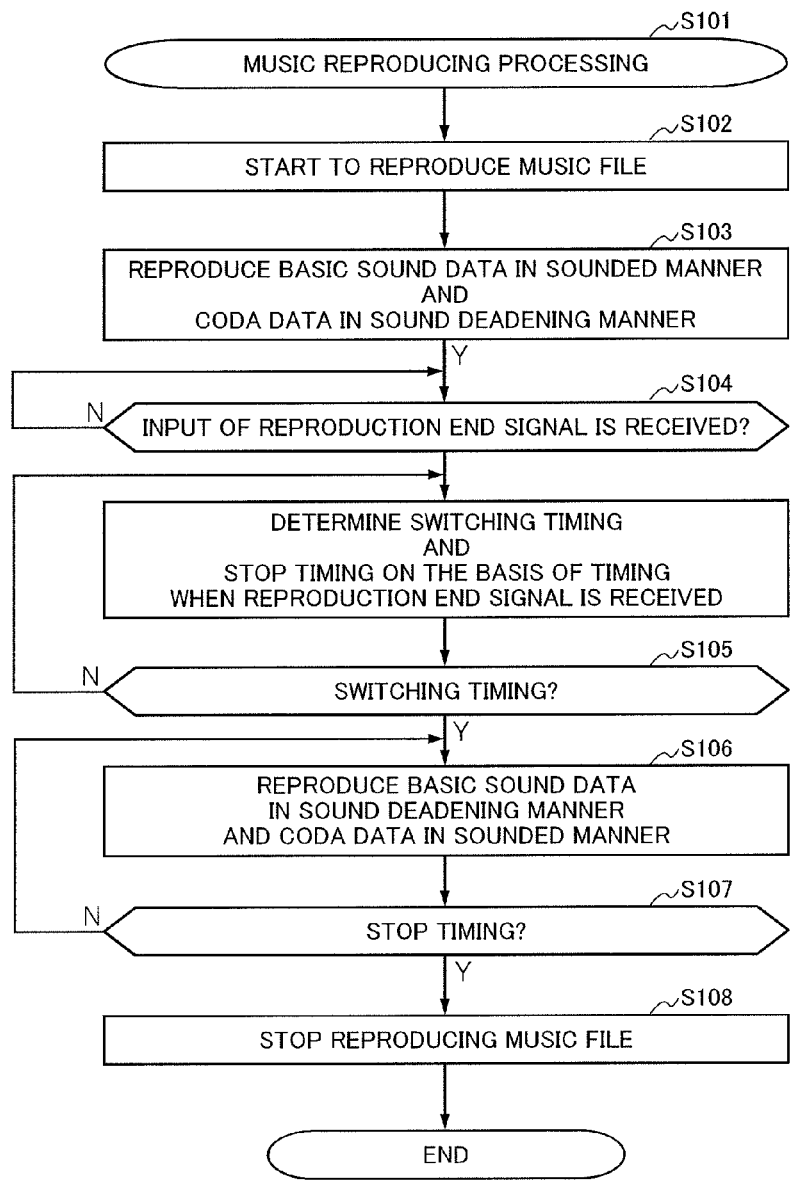
FIG. 6 is a flowchart showing an example of music reproducing processing.

FIG. 6 is a flowchart showing an example of music reproducing processing carried out by the video game processing apparatus 100. In the music reproducing processing, processing to start to reproduce music according to progress of the video game and processing to stop reproducing the music at proper timing are carried out. In this regard, the content of processing with no relationship to the present invention may be omitted.

The music reproducing processing is started when a music reproducing condition is met in accordance with progress of the video game, for example, when an event to be carried out during the video game occurs.

In the music reproducing processing, the control section 11 first refers to the music file storage section 12b, and starts to reproduce a music file according to the met music reproducing condition (Step S101). Here, the reproduction of a music file may include processing to reproduce an image associated with a music file on a display screen in addition to processing to reproduce sound data contained in the music file (that is, basic sound data and coda data).

When reproduction of the music file is started, the control section 11 reproduces basic sound data in a sounded manner and reproduces coda data in a sound deadening manner (Step S102). The basic sound data and the coda data are contained in the music file for which reproduction is started. In this regard, in the present embodiment, in order not to provide a feeling of strangeness to a user at the time of switching the sound indicated by the basic sound data and the coda data, both data are reproduced in synchronization. However, since known technique is used for the method of synchronizing data, the detailed description herein is omitted.

When the sounded reproduction of the basic sound data is started, the control section 11 determines whether an input of a reproduction end signal is received or not (Step S103). In the present embodiment, the reproduction end signal is inputted by the control section 11 when it becomes predetermined reproduction end timing in the video game, for example, at the end of the event or the like. In this regard, the video game processing apparatus 100 may be configured so as to receive a reproduction end operation by the user, for example.

Here, in a case where it is determined that the input of the reproduction end signal is not received ("No" at Step S103), the control section 11 causes the processing flow to shift to Step S102, and continues the sounded reproduction of the basic sound data and the sound deadening reproduction of the coda data. On the other hand, in a case where it is determined that the input of the reproduction end signal is received because an event during the video game is terminated, for example ("Yes" at Step S103), the control section 11 determines switching timing and stop timing on the basis of timing when a reproduction end signal is received (Step S104). In the present embodiment, the control section 11 refers to the marker data in the music file (see FIG. 3); determines, as the switching timing, the shortest one of music reproduction times that do not elapse at the time when an input of the reproduction end signal is received among times associated with the markers (in the present embodiment, the music reproduction times); and determines the second shortest one as the stop timing. Namely, when the control section 11 receives a reproduction end signal after 10 seconds from the time when reproduction of the music file is started, for example, the control section 11 determines 10.5 seconds later from the time when the reproduction of the music file is started as the switching timing, and determines 11.0 seconds later as the stop timing (see FIG. 3).

In this regard, the method of determining the switching timing and the stop timing is not limited to this method. For example, the video game processing apparatus 100 may be configured so as to determine the timing, at which the marker is set up, as the switching timing and the stop timing by removing a marker associated with music reproduction time that reaches within 1.0 seconds after receiving the reproduction end signal from choices (selectable objects). Further, in the present embodiment, by a time measurer (timer) (not shown in the drawings) included in the video game processing apparatus 100, time required to determine the switching timing and the stop timing is measured. Further, the video game processing apparatus 100 may be configured so as to always allow interruption of the reproduction of the music file, or so as not to allow the interruption of the reproduction of the music file after a reproduction end signal is received.

When the switching timing and the stop timing are determined, the control section 11 determines whether it becomes switching timing or not (Step S105). Here, in a case where it is determined that it becomes the switching timing because the reproduction time of the music file becomes the same time associated with the marker (or before or after a predetermined time) ("Yes" at Step S105), the control section 11 switches the basic sound data from the sounded reproduction to the sound deadening reproduction, and switches the coda data from the sound deadening reproduction to the sounded reproduction (Step S106).

When the reproduction modes are switched, the control section 11 determines whether it becomes stop timing or not (Step S107). Here, in a case where it is determined that it becomes the stop timing ("Yes" at Step S107), the control section 11 stops reproducing the music file (that is, stops the sound deadening reproduction of the basic sound data and the sounded reproduction of the coda data) (Step S108), and terminates the processing herein.

As explained above, in the embodiment described above, the video game processing apparatus 100 for controlling progress of the video game is configured so as to: include the basic sound data storage section (for example, the music file storage section 12*b*) for storing the basic sound data that indicate a game sound to be reproduced in the video game, the coda data storage section (for example, the music file storage section 12*b*) for storing the coda data that indicate coda used as a termination sound when the reproduction of the game sound is terminated; and a marker data memory (for example, the music file storage section 12*b*) for storing the marker data that indicate a plurality of markers, each of which is timing when the reproduction modes can be switched; start sounded reproduction of the basic sound data and sound deadening reproduction of the coda data when it becomes the predetermined reproduction start timing in the video game (for example, Step S102); reproduce the basic sound data and the coda data in synchronization with each other; when it becomes the predetermined reproduction end timing in the video game, refer to the marker data to determine switching timing to switch reproduction modes and stop timing to stop reproducing (Step S104); when it becomes the switching timing, switch the sounded reproduction of the basic sound data into sound deadening reproduction and switch the sound deadening reproduction of the coda data into sounded reproduction (for example, Step S106); and stop the reproduction of the basic sound data and the coda data when it becomes the stop timing (Step S108). Therefore, it becomes possible to smoothly terminate reproduction of the music in the video game.

Namely, the video game processing apparatus 100 prepares in advance a music file, in which the coda track (for example, the two coda tracks in which the coda data are stored) is embedded as an end reproduction portion for an additional track in addition to the normal reproduction track (for example, the two basic sound tracks in which the basic sound data are stored); specifies a switching point (for example, the switchable timing) in this music file; and reproduces and outputs only the normal reproduce track at the start of reproduction of the music, wherein the coda track is reproduces but an audio output is set to a mute state. Then, the video game processing apparatus 100 does not stop the reproduction immediately when an end signal of the music reaches in accordance with progress of the video game, but immediately switches the audio output into the coda track after waiting for timing when the reproduction point reaches a next marker (the normal track is set to the mute state at the same time when the coda track is set to an output state). In addition, the video game processing apparatus 100 is configured so as to continue the reproduction of the music until a next marker appears, and the audio reproduction of all tracks is stopped when the next marker appears. For that reason, it is possible to smoothly terminate reproduction of music in the video game without generating a gap (silent state) during switching into coda.

Further, by applying authority to set up a marker to a composer, for example, it is possible to specify timing that the composer thinks to be appropriate to switchable (or stoppable timing). For this reason, it is possible to utilize music in the video game more effectively.

Further, in the embodiment described above, the video game processing apparatus 100 is configured so as to include the music file storage section 12b for storing the music file in which the basic sound tracks (for example, tracks 1 and 2) as the basic sound data storage section for storing the basic sound data and the coda tracks 3, 4 as the coda data storage section for storing the coda data so as to be capable of being reproduced in synchronization with the basic sound data are stored. Therefore, it is possible to allow switching into the coda (or stopping of reproduction) at only positions (timing) designated by a designer by using a plural-track state transition system within one file. This makes it possible to provide a mechanism that not only terminates the reproduction simply at the end of the music, but also terminates the reproduction after reproducing coda (that is, an end portion, outro) and a system capable of transiting the reproduction quickly without a feeling of strangeness.

Further, in the embodiment described above, the video game processing apparatus 100 is configured so that the marker data storage section is stored in the music file. Therefore, it is possible to avoid the music file from being divided into two files, that is, a normal reproducing section (for example, the basic sound data) and a coda section (for example, the coda data). This makes useful for streaming processing and/or file management. Namely, since it is possible to configure a music file in which all of the data are contained in one file, there is no need for a complex management mechanism.

Further, although it has not been mentioned particularly in the embodiment described above, the coda data may be configured so that the same data are set up sequentially between two adjacent markers. By configuring the video game processing apparatus 10 in such a manner, it becomes easy to create coda data, and this makes it possible to reduce a load to create a music file. On the other hand, the coda data may be configured so that different data are set up in part or all of portions between two adjacent markers. In the case of configuring the coda data in this manner, the coda data can be configured so that data consistent with the corresponding basic sound data are set up in every portion between two adjacent markers, and this makes it possible to smoothly terminate the music.

In this regard, in the embodiment described above, the video game processing apparatus 100 is configured so as to carry out various kinds of processings such as the game processing described above on the basis of the video game program read out from the game cartridge 20. However, the video game processing apparatus 100 may be configured so as to acquire the video game program via the communication network such as the Internet. Further, the video game processing apparatus 100 may be configured so as to function as a video game server to provide the video game program to a video game terminal via the communication network.

Further, in the embodiment described above, the video game processing apparatus 100 carries out the various kinds of processes described above in accordance with various kinds of control programs (for example, the video game processing program product) stored in a storage device (the storage section 12) with which the video game processing apparatus 100 itself is provided.

INDUSTRIAL APPLICABILITY

The present invention is useful to be capable of smoothly terminating reproduction of music in a video game.

What is claimed is:

1. A video game processing apparatus for controlling progress of a video game, comprising:
a basic sound data memory for storing basic sound data, the basic sound data indicating a game sound to be reproduced in the video game;
a coda data memory for storing coda data, the coda data indicating coda used as a termination sound when the reproduction of the game sound is terminated;
a marker data memory for storing marker data, the marker data indicating a plurality of markers, each of the plurality of markers being timing when a reproduction mode can be switched;
a reproducer that starts sounded reproduction of the basic sound data and sound deadening reproduction of the coda data when it becomes predetermined reproduction start timing in the video game, the reproducer reproducing the basic sound data and the coda data in synchronization with each other; and
a timing determiner that refers to the marker data when it becomes predetermined reproduction end timing in the video game, the timing determiner determining switching timing to switch the reproduction modes and stop timing to stop reproducing,
wherein the reproducer includes:
a switcher for switching, when it becomes the switching timing, the sounded reproduction of the basic sound data into sound deadening reproduction, the switcher switching the sound deadening reproduction of the coda data into sounded reproduction; and
a stopper for stopping the reproduction of the basic sound data and the coda data when it becomes the stop timing.

2. The video game processing apparatus according to claim 1, further comprising:
a music file memory for storing a music file, a basic sound track and a coda track being stored in the music file, the basic sound track functioning as the basic sound data memory for storing the basic sound data, the coda track functioning as the coda data memory for storing the coda data so as to be capable of being reproduced in synchronization with the basic sound data.

3. The video game processing apparatus according to claim 2, wherein the marker data memory is stored in the music file.

4. The video game processing apparatus according to claim 1, wherein the coda data are configured so that the same data are set up sequentially between two adjacent markers.

5. A non-transitory computer-readable medium including a video game processing program product for causing a computer to control progress of a video game,
the computer comprising:
a basic sound data memory for storing basic sound data, the basic sound data indicating a game sound to be reproduced in the video game;
a coda data memory for storing coda data, the coda data indicating coda used as termination sound when reproduction of the game sound is terminated; and
a marker data memory for storing marker data, the marker data indicating a plurality of markers, each of the plurality of markers being timing when a reproduction mode can be switched,
the video game processing program product causing the computer to execute:
starting sounded reproduction of the basic sound data and sound deadening reproduction of the coda data when it becomes predetermined reproduction start timing in the video game, and reproducing the basic sound data and the coda data in synchronization with each other; and referring to the marker data when it becomes predetermined reproduction end timing in the video game, and determining switching timing to switch reproduction modes and stop timing to stop reproducing, wherein the step of reproducing the basic sound data and the coda data in synchronization with each other includes:

switching, when it becomes the switching timing, the sounded reproduction of the basic sound data into sound deadening reproduction, and switching the sound deadening reproduction of the coda data into sounded reproduction; and stopping the reproduction of the basic sound data and the coda data when it becomes the stop timing.

* * * * *